United States Patent
Li (10) Patent No.: US 11,805,436 B2
(45) Date of Patent: Oct. 31, 2023

(54) METHOD, AND DEVICE FOR REPORTING BEAM MEASUREMENT REPORT

(71) Applicant: BEIJING XIAOMI MOBILE SOFTWARE CO., LTD., Beijing (CN)

(72) Inventor: Mingju Li, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 362 days.

(21) Appl. No.: 17/272,468

(22) PCT Filed: Sep. 13, 2018

(86) PCT No.: PCT/CN2018/105558
§ 371 (c)(1),
(2) Date: Mar. 1, 2021

(87) PCT Pub. No.: WO2020/051844
PCT Pub. Date: Mar. 19, 2020

(65) Prior Publication Data
US 2021/0258813 A1  Aug. 19, 2021

(51) Int. Cl.
*H04W 24/10* (2009.01)
*H04B 7/06* (2006.01)
(Continued)

(52) U.S. Cl.
CPC .......... *H04W 24/10* (2013.01); *H04B 7/0695* (2013.01); *H04W 72/046* (2013.01);
(Continued)

(58) Field of Classification Search
CPC ... H04W 24/10; H04W 72/046; H04W 72/23; H04W 72/53; H04W 80/02; H04B 7/0695
See application file for complete search history.

(56) References Cited

U.S. PATENT DOCUMENTS

2019/0223043 A1* 7/2019 Geng .................... H04L 5/0051
2019/0356439 A1* 11/2019 Lee ........................ H04L 5/0048
(Continued)

FOREIGN PATENT DOCUMENTS

| CN | 108112030 A | | 6/2018 | |
|---|---|---|---|---|
| CN | 109587793 A | * | 4/2019 | .......... H04L 5/0048 |
| WO | WO 2018/128520 A1 | | 7/2018 | |

OTHER PUBLICATIONS

Extended European Search Report dated Apr. 8, 2022 in European Patent Application No. 18933634.0, 12 pages.
(Continued)

*Primary Examiner* — Deepa Belur
(74) *Attorney, Agent, or Firm* — Oblon, McClelland, Maier & Neustadt, L.L.P.

(57) ABSTRACT

The disclosure relates to a method and a device for reporting a beam measurement report. The method includes: obtaining, by a terminal, a beam measurement result, in which the beam measurement result includes channel measurement parameters corresponding to n reference signals RSs included in a set of target RSs and channel measurement parameters corresponding to m other RSs except the set of target RSs, the set of target RSs is corresponding to a set of target transmission configuration indication TCI states; transmitting, by the terminal, the beam measurement report to the network access equipment when the beam measurement result satisfies a preset condition; and receiving, by the terminal, TCI state update information from the network access equipment, in which the TCI state update information is configured to indicate TCI states included in the updated set of target TCI states.

20 Claims, 4 Drawing Sheets

(51) Int. Cl.
H04W 72/044 (2023.01)
H04W 80/02 (2009.01)
H04W 72/23 (2023.01)
H04W 72/53 (2023.01)

(52) U.S. Cl.
CPC ........... *H04W 72/23* (2023.01); *H04W 72/53* (2023.01); *H04W 80/02* (2013.01)

(56) References Cited

U.S. PATENT DOCUMENTS

| | | | |
|---|---|---|---|
| 2020/0099492 A1* | 3/2020 | Shi | H04L 5/0053 |
| 2021/0076324 A1* | 3/2021 | Kaikkonen | H04W 52/0274 |
| 2022/0217751 A1* | 7/2022 | Zhou | H04W 72/51 |
| 2023/0209526 A1* | 6/2023 | Li | H04B 7/088 |
| | | | 370/329 |

OTHER PUBLICATIONS

ZTE Corporation et al., "Configuration structure of the reportTrigger in CSI-MeasConfig (RILNo. Z019)", 3GPP Draft, R2-1801536, $3^{rd}$ Generation Partnership Project (3GPP) TSG-RAN WG2 NR ad hoc 0118, Vancouver, CA, Jan. 22-26, 2018, 7 pages, XP051386989.

Vivo, "Discussion on beam measurement, beam reporting and beam indication", 3GPP Draft, R1-1717472, $3^{rd}$ Generation Partnership Project (3GPP) TSG RAN WG1 Meeting #90bis, Prague, CZ, Oct. 9-13, 2017, 12 pages, XP051340660.

International Search Report dated May 5, 2019 in PCT/CN2018/105558 filed on Sep. 13, 2018, 2 pages.

"Remaining details on beam measurement and reporting," vivo, 3GPP TSG RAN WG1 Meeting #91, R1-1719769, 2017, 8 total pages.

\* cited by examiner

METHOD, AND DEVICE FOR REPORTING BEAM MEASUREMENT REPORT

CROSS-REFERENCE TO RELATED APPLICATION

This application is the national phase application of International Application No. PCT/CN2018/105558 filed on Sep. 13, 2018, the entire contents of which are incorporated herein by reference for all purposes.

TECHNICAL FIELD

Embodiments of the disclosure relate to the field of communication technologies, including to a method, an apparatus, a device, and a storage medium for reporting a beam measurement report.

BACKGROUND

In a 5G (5th-Generation Mobile Network or 5th-Generation Wireless System) NR (New Radio) system, a network access equipment and a terminal may transmit and receive information with each other through beams. For example, control signaling and service data interacted between the network access equipment and the terminal may be transmitted and received through beams.

The terminal may determine a receiving beam of DCI (Downlink Control Information) through the following manner. The terminal may measure a beam based on measurement configuration provided by the network access equipment, and transmits a beam measurement report to the network access equipment, in which the beam measurement report includes a RS (Reference Signal) type, a RS identifier, and an L1-RSRP (Layer 1-Reference Signal Received Power) corresponding to the beam; the network access equipment may determine at least one Type D TCI (Transmission Configuration Indication) state based on the beam measurement report from the terminal, and each TCI state corresponds to one RS identifier. Further, the network access equipment notifies the terminal of the at least one TCI state through RRC (Radio Resource Control) signaling, including an identifier of each TCI state and the corresponding RS type and RS identifier; if the RRC signaling notifies a plurality of TCI states, the network access equipment may activate one of the plurality of TCI states through MAC (Medium Access Control) CE (Control Element) signaling, and the activated TCI state is transmission state configuration of PDCCH (Physical Downlink Control Channel) provided to the terminal by the network access equipment, that is, the terminal is notified that a receiving beam for receiving DCI on PDCCH should be the same as a receiving beam for receiving RS corresponding to the TCI state. Subsequently, the terminal may use the determined receiving beam to receive the DCI on the PDCCH.

In addition, the terminal may determine a receiving beam of downlink data in a similar manner as follows. The network access equipment may determine a plurality of TCI states based on the beam measurement report from the terminal, and notifies the terminal of the plurality of TCI states through the RRC signaling. After notification, the network access equipment may activate several (for example, up to 8) of the plurality of TCI states through the MAC CE signaling, and notifies the terminal through DCI that which TCI state of the activated TCI states is configured in PDSCH (Physical Downlink Shared Channel). The TCI state notified through the DCI is transmission state configuration of PDSCH provided to the terminal by the access network equipment, that is, the terminal is notified that a receiving beam for receiving downlink data on PDSCH5 should be the same as a receiving beam for receiving RS corresponding to the TCI state. After then, the terminal may use the determined receiving beam to receive the downlink data on PDSCH.

When the terminal moves or antenna directions of the network access equipment change, the beams configured in the network access equipment for transmitting downlink control information and downlink data to the terminal, may change. If the TCI state is not updated, transmitting and receiving beams configured for the terminal may not be the most suitable ones. In order to update the TCI state, the terminal needs to transmit the beam measurement report to the network access equipment. However, the current method for reporting the beam measurement report is periodic, semi-static or aperiodic, and the method is configured by the network access equipment. The semi-static reporting method means that the terminal starts to transmit the beam measurement report to the network access equipment after receiving activation signaling from the network access equipment, and the terminal will stop reporting when transmitting the beam measurement report satisfies certain times or receiving deactivation signaling from the network access equipment. For the periodic and semi-static reporting methods, if a reporting interval is too small, it may cause more unnecessary reporting and not conducive to saving terminal signaling overhead and power consumption; if the reporting interval is too large, it may cause delayed reporting and lead to beam failure and other problems. The aperiodic reporting method also has the problem of untimely reporting.

Therefore, the method for reporting the beam measurement report and reporting times provided can be unreasonable and inaccurate.

SUMMARY

Embodiments of the disclosure provide a method, an apparatus, a device, and a storage medium for reporting a beam measurement report. The technical solutions may be as follows.

According to a first aspect of the disclosure, a method for reporting a beam measurement report can include obtaining, by a terminal, a beam measurement result, in which the beam measurement result includes channel measurement parameters corresponding to n reference signals RSs included in a set of target RSs and channel measurement parameters corresponding to m other RSs except the set of target RSs, the set of target RSs is corresponding to a set of target transmission configuration indication TCI states, and the set of target TCI states includes n TCI states indicated by a network access equipment to the terminal, where n is a positive integer, and m is a positive integer. The method can further include transmitting, by the terminal, the beam measurement report to the network access equipment when the beam measurement result satisfies a preset condition, in which the beam measurement report is configured to trigger the network access equipment to update the set of target TCI states, and receiving, by the terminal, TCI state update information from the network access equipment, in which the TCI state update information is configured to indicate TCI states included in the updated set of target TCI states.

According to a second aspect of the disclosure, a method for reporting a beam measurement report can include receiving from a terminal, by a network access equipment, the beam measurement report that is transmitted by the terminal when a beam measurement result satisfies a preset condition, in which the beam measurement result includes channel measurement parameters corresponding to n reference signals RSs included in a set of target RSs and channel measurement parameters corresponding to m other RSs except the set of target RSs, the set of target RSs is corresponding to a set of target transmission configuration indication TCI states, and the set of target TCI states includes n TCI states indicated by a network access equipment to the terminal, where n is a positive integer, and m is a positive integer. The method can also include updating, by the network access equipment, the set of target TCI states based on the beam measurement report, and transmitting, by the network access equipment, TCI state update information to the terminal, in which the TCI state update information is configured to indicate TCI states included in the updated set of target TCI states.

According to a third aspect of the disclosure, a terminal is provided. The terminal can include a processor and a memory configured to store instructions executable by the processor. The processor can be configured to obtain a beam measurement result, in which the beam measurement result includes channel measurement parameters corresponding to n reference signals RSs included in a set of target RSs and channel measurement parameters corresponding to m other RSs except the set of target RSs, the set of target RSs is corresponding to a set of target transmission configuration indication TCI states, and the set of target TCI states includes n TCI states indicated by a network access equipment to the terminal, where n is a positive integer, and m is a positive integer. The processor can be further configured to transmit the beam measurement report to the network access equipment when the beam measurement result satisfies a preset condition, in which the beam measurement report is configured to trigger the network access equipment to update the set of target TCI states, and receive TCI state update information from the network access equipment, in which the TCI state update information is configured to indicate TCI states included in the updated set of target TCI states.

According to a fourth aspect of the disclosure, a network access equipment is provided. The network access equipment can include a processor and a memory configured to store instructions executable by the processor. The processor can be configured to receive from a terminal the beam measurement report that is transmitted by the terminal when a beam measurement result satisfies a preset condition, in which the beam measurement result includes channel measurement parameters corresponding to n reference signals RSs included in a set of target RSs and channel measurement parameters corresponding to m other RSs except the set of target RSs, the set of target RSs is corresponding to a set of target transmission configuration indication TCI states, and the set of target TCI states includes n TCI states indicated by a network access equipment to the terminal, where n is a positive integer, and m is a positive integer. The processor can be further configure to update the set of target TCI states based on the beam measurement report, and transmitting TCI state update information to the terminal, in which the TCI state update information is configured to indicate TCI states included in the updated set of target TCI states.

It should be understood that, the above general description and the following detailed description are only exemplary and explanatory, and does limit the disclosure.

BRIEF DESCRIPTION OF THE DRAWINGS

The accompanying drawings, which are incorporated in and constitute a part of this specification, illustrate exemplary embodiments consistent with the disclosure and, together with the specification, serve to explain the principles of the disclosure.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the disclosure. Instead, they are merely examples of apparatuses and methods consistent with aspects related to the disclosure as recited in the appended claims.

The network architecture and service scenarios described in the embodiments of the disclosure are to explain technical solutions of the embodiments of the disclosure more clearly, and do not constitute a limitation to the technical solutions provided in the embodiments of the disclosure. Those skilled in the art may know that the technical solutions provided in the embodiments of the disclosure are equally applicable to similar technical problems as the network architecture evolves and new service scenarios appear.

Figure 1:
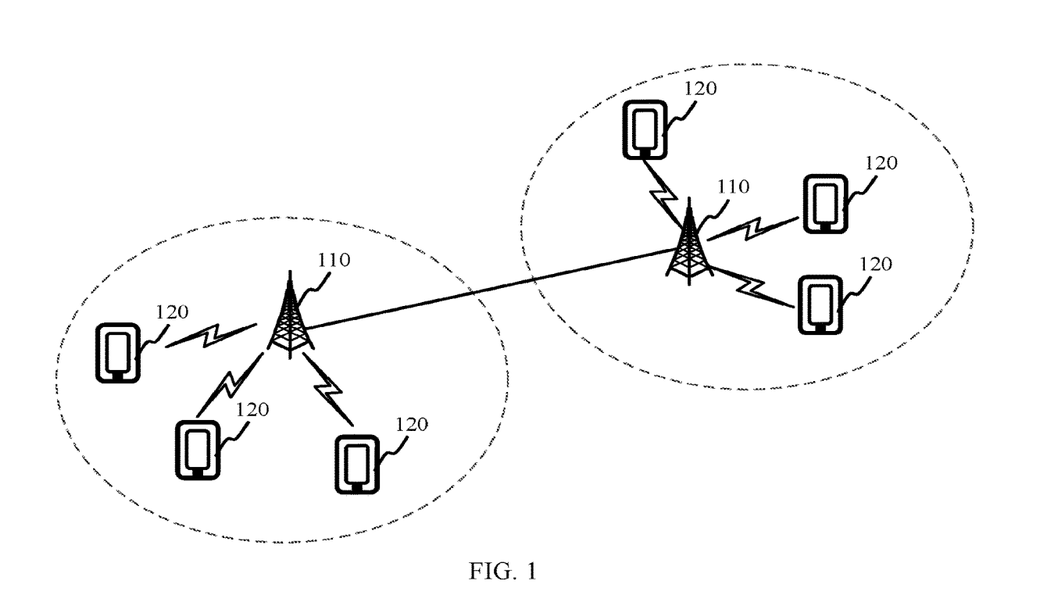
FIG. 1 is a schematic diagram illustrating a network architecture, according to an exemplary embodiment.

FIG. 1 is a schematic diagram illustrating a network architecture, according to an exemplary embodiment. The network architecture includes a network access equipment 110 and a terminal 120. The network access equipment 110 can be deployed in an access network. The access network in the 5G NR system may be called as NG-RAN (New Generation-Radio Access network). The network access equipment 110 and the terminal 120 may communicate with each other through a certain radio technology, such as a cellular technology.

The network access equipment 110 may be a BS (Base Station). The base station is an apparatus deployed in the access network and for providing a wireless communication function to the terminal. The base stations may include various forms of macro base stations, micro base stations, relay stations, access points, and the like. In systems adopting different wireless access technologies, devices equipped with functions of base stations may have different names. For example, in the 5G NR system, it can be called as gNodeB or gNB. The name "base station" may change with the evolution of communication technologies. For the sake of easy description, in the embodiments of the disclosure, the apparatus that provides the wireless communication function to the terminal is collectively called as the network access equipment.

There may be a plurality of terminals 120. One or more terminals 120 may be deployed in a cell governed by each network access equipment 110. The terminals 120 may include hand-held devices, on-board devices, wearable devices, and computing devices with the wireless communication function, or other processing devices connected to a wireless modem, as well as various forms of UE (User Equipment), MS (Mobile Station), terminal devices, etc. For the sake of easy description, in the embodiments of the disclosure, these devices are collectively called as the terminals.

The "5G NR system" in the embodiments of the disclosure may also be called as a 5G system or a NR system, and those skilled in the art can understand its meaning. The technical solutions described in the embodiments of the disclosure may be applicable to the 5G NR system, and may also be applicable to subsequent evolution systems of the 5G NR system.

In the technical solutions provided in the disclosure, a beam measurement result is obtained through a terminal. When the terminal detects that the beam measurement result satisfies a preset condition, the terminal transmits the beam measurement report to the network access equipment. Compared with the terminal adopting the periodic, aperiodic or semi-static approach to transmit the beam measurement report to the network access equipment, the technical solutions provided in the embodiments of the disclosure overcome the problems of delayed reporting and more unnecessary reporting, and the terminal transmits the beam measurement report at a reasonable and accurate moment. In addition, the terminal transmits the beam measurement report to the network access equipment when the terminal detects that the beam measurement result satisfies the preset condition, so that the network access equipment may update the set of TCI states in a timely manner based on the beam measurement report and ensure that the terminal may select an appropriate beam to perform downlink reception and transmission. In the following contents, several embodiments will be illustrated to introduce and explain the technical solutions provided in the disclosure.

Figure 2:
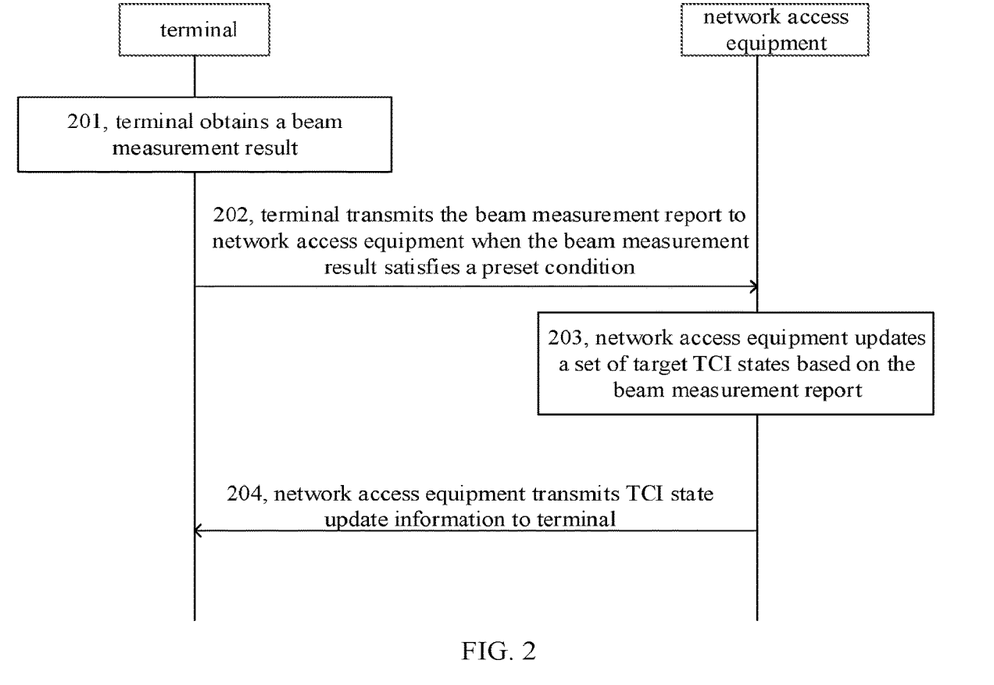
FIG. 2 is a schematic diagram illustrating a method for reporting a beam measurement report, according to an exemplary embodiment.

FIG. 2 is a flow chart illustrating a method for reporting a beam measurement report according to an exemplary embodiment. This method is applicable to the network architecture illustrated in FIG. 1. The method may include actions in the following blocks.

In block 201, a terminal obtains a beam measurement result. In embodiments of the disclosure, the beam measurement result includes: channel measurement parameters corresponding to n RSs included in a set of target RSs, and channel measurement parameters corresponding to m other RSs except the set of target RSs. The set of target RSs is corresponding to a set of target TCI states. The set of target TCI states includes n TCI states indicated by the network access equipment to the terminal, where n is a positive integer, and m is a positive integer. Every TCI state is corresponding to one RS, and different TCI states are corresponding to different RSs.

In one example, the set of target TCI states is a set of TCI states of PDCCH indicated by the network access equipment to the terminal through RRC signaling, or activated by the network access equipment through MAC CE signaling. For a beam transmission scenario, when the terminal determines a receiving beam of DCI, the network access equipment may indicate the set of TCI states of PDCCH to the terminal through the RRC signaling, in which this set of TCI states includes at least one TCI state. Optionally, this set of TCI states includes up to 64 TCI states. In addition, if the set of TCI states of PDCCH, indicated by the network access equipment to the terminal through the RRC signaling, includes a plurality of TCI states, the network access equipment may also activate one of the plurality of TCI states through the MAC CE signaling.

In another example, the set of target TCI states is a set of TCI states of PDSCH indicated by the network access equipment to the terminal through RRC signaling, or activated by the network access equipment through MAC CE signaling. For a beam transmission scenario, when the terminal determines a receiving beam of downlink data, the network access equipment may indicate the set of TCI states of PDCCH to the terminal through the RRC signaling, in which this set of TCI states includes at least one TCI state. Optionally, this set of TCI states includes up to 64 TCI states. In addition, the network access equipment may also activate at least one of the plurality TCI states through the MAC CE signaling, such as activating up to 8 TCI states in the plurality of TCI states.

In embodiments of the disclosure, other RSs are candidate RSs for updating RSs of the set of target RSs. Optionally, other RSs may be configured by the network access equipment and notified to the terminal.

In embodiments of the disclosure, the channel measurement parameter may include at least one of the following parameters: channel quality, L1-RSRP, L1-RSRQ (Layer 1-Reference Signal Received Quality), and L1-SINR (Layer 1-Signal to Interference and Noise Ratio). When a type of the channel measurement parameter is channel quality or L1-RSRQ or L1-SINR, the terminal needs to measure RSRP and interference corresponding to each RS. It should be noted that RSRP and interference corresponding to the same RS need to use the same receiving beam to measure.

It should be noted that the channel measurement parameter corresponding to which RS that needs to be obtained by the terminal, may be configured by the network access equipment and notified to the terminal. In addition, which type of channel measurement parameter the terminal needs to obtain may also be configured by the network access equipment and notified to the terminal. In addition, the terminal may periodically or aperiodically obtain the beam measurement result.

In block 202, the terminal transmits the beam measurement report to the network access equipment when the beam measurement result satisfies a preset condition. The preset condition may refer to a preset configured condition for triggering the terminal to transmit the beam measurement report to the network access equipment. The preset condition may be configured by the network access equipment and notified to the terminal.

In embodiments of the disclosure, the beam measurement report is configured to trigger the network access equipment to update the set of target TCI states.

The terminal may transmit the beam measurement report to the network access equipment through PUCCH (Physical Uplink Control Channel) or PUSCH (Physical Uplink Shared Channel). The beam measurement report may include identification information of k RSs and indication information of channel measurement parameters corresponding to the k RSs, where k is an integer greater than 1, the k RSs include then RSs and at least one of the m other RSs, the at least one of the m other RSs has a channel measurement parameter greater than a channel measurement parameter corresponding to a target RS, in which the target RS is a RS with the smallest channel measurement parameter in the n RSs.

The identification information of RS is also called a RS index, and configured to uniquely indicate RS. Different RSs correspond to different identification information. In embodiments of the disclosure, RS may be NZP CSI-RS (Non-Zero Power Channel Status Information Reference Signal), or SSB (Synchronization Signal Block).

Optionally, the preset condition may include any of the following.

1. Top w RSs in descending order in a channel measurement parameter corresponding to each RS in the beam measurement result are different from that of a beam measurement result obtained last time, and w is a positive integer. The beam measurement result obtained by the terminal in block 201 may be called the beam measurement result obtained this time. The beam measurement result obtained last time is a beam measurement result obtained once before. In addition, a value of w may be preset, such as w may be configured by the network access equipment, which is not limited in embodiments of the disclosure.

For example, the set of target RSs includes the following RSs: RS #1, RS #2 and RS #3, and other RSs include RS #4 and RS #5. In the beam measurement result obtained last time, each RS may be sorted as RS #1, RS #2, RS #3, RS #4, and RS #5 in descending order based on the channel measurement parameter. In the beam measurement result obtained this time, each RS may be sorted as RS #5, RS #4, RS #3, RS #2, and RS #1 in descending order based on the channel measurement parameter. Assuming that w is 3, since the first 3 RSs have changed in the two sorting results, the preset condition may be satisfied. At this time, the terminal may transmit the beam measurement report to the network access equipment, in which the beam measurement report may include indication information of a channel measurement parameter corresponding to each RS in the set of target RSs (that is, RS #1, RS #2, and RS #3) and may also include indication information of a channel measurement parameter corresponding to RS #4.

When the beam measurement result satisfies the preset condition, it indicates that the order of RSs with greater channel measurement parameter has changed. At that time, the terminal transmits the beam measurement report to the network access equipment so that the network access equipment may update the set of target TCI states based on the beam measurement report. For example, the TCI state corresponding to a RS with greater channel measurement parameter is added to the set of target TCI states, and the TCI state corresponding to a RS with smaller channel measurement parameter is deleted from the target TCI state set.

2. A channel measurement parameter corresponding to at least one RS in the set of target RSs is smaller than a first threshold.

The first threshold may be preset, such as the first thresholds may be configured by the network access equipment or pre-determined by protocol, which is not limited in embodiments of the disclosure.

For example, the set of target RSs includes the following RSs: RS #1, RS #2 and RS #3, and the type of the channel measurement parameter is L1-RSRP. Assuming L1-RSRP corresponding to RS #1 is less than the first threshold, and L1-RSRP corresponding to RS #2 and RS #3 is not less than the first threshold. In this case, the beam measurement result satisfies the preset condition. At this time, the terminal may transmit the beam measurement report to the network access equipment, in which the beam measurement report may include indication information of L1-RSRP respectively corresponding to each RS in the set of target RSs (that is, RS #1, RS #2, and RS #3).

When the beam measurement result satisfies the preset condition, it indicates that there is a TCI state of RS with smaller channel measurement parameter in the set of target TCI states. At that time, the terminal transmits the beam measurement report to the network access equipment so that the network access equipment may update the set of target TCI states based on the beam measurement report, such as deleting the TCI state corresponding to RS with smaller channel measurement parameter from the set of target TCI states.

3. A sum of a channel measurement parameter corresponding to at least one RS in the set of target RSs and a preset offset is less than a maximum of channel measurement parameters corresponding to the m other RSs.

The preset offset may be preset, such as the preset offset may be configured by the network access equipment or pre-determined by protocol, which is not limited in embodiments of the disclosure. Optionally, the preset offset is greater than 0. For example, the set of target RSs includes the following RSs: RS #1, RS #2 and RS #3, other RSs include RS #4 and RS #5, and the type of the channel measurement parameter is L1-RSRP. Assuming that the maximum of L1-RSRP corresponding to other RSs is L1-RSRP corresponding to RS #5, the sum of L1-RSRP corresponding to RS #2 and the preset offset is less than L1-RSRP corresponding to RS #5, so the preset condition may be satisfied. At this time, the terminal may transmit the beam measurement report to the network access equipment, in which the beam measurement report may include indication information of L1-RSRP respectively corresponding to each RS (that is, RS #1, RS #2, and RS #3) in the set of target RSs, and also include indication information of L1-RSRP corresponding to RS #5.

When the beam measurement result satisfies the preset condition, it indicates that there is a TCI state corresponding to RS with smaller channel measurement parameter in the set of target TCI states and also a TCI state corresponding to other RS with greater channel measurement parameter. At that time, the terminal transmits the beam measurement report to the network access equipment so that the network access equipment may update the set of target TCI states based on the beam measurement report. For example, the TCI state corresponding to other RS with greater channel measurement parameter is added to the set of target TCI states, and the TCI state corresponding to RS with smaller channel measurement parameter is deleted from the set of target TCI states.

4. A channel measurement parameter corresponding to at least one other RS in the m other RSs is greater than a second threshold.

The second threshold may be preset, such as the second threshold may be configured by the network access equipment or pre-determined by protocol, which is not limited in embodiments of the disclosure. For example, other RSs include RS #4 and RS #5, and the type of the channel measurement parameter is L1-RSRP. Assuming L1-RSRP corresponding to RS #4 is greater than the second threshold, and L1-RSRP corresponding to RS #5 is less than the second threshold. In this case, the beam measurement result satisfies the preset condition. At this time, the terminal may transmit the beam measurement report to the network access equipment, in which the beam measurement report may include indication information of L1-RSRP respectively corresponding to each RS in the set of target RSs and indication information of L1-RSRP corresponding to RS #4.

When the beam measurement result satisfies the preset condition, it indicates that there is a TCI state corresponding to other RS with greater channel measurement parameter. At that time, the terminal transmits the beam measurement report to the network access equipment so that the network access equipment may update the set of target TCI states based on the beam measurement report, such as adding the TCI state corresponding to other RS with greater channel measurement parameter to the set of target TCI states.

5. A channel measurement parameter corresponding to at least one RS in the set of target RSs is smaller than a third threshold, and a channel measurement parameter corresponding to at least one other RS in the m other RSs is greater than a fourth threshold.

The third and the fourth thresholds may be preset, such as the third and the fourth thresholds may be configured by the network access equipment or pre-determined by protocol, which is not limited in embodiments of the disclosure. For example, the set of target RSs includes the following RSs: RS #1, RS #2 and RS #3, and other RSs include RS #4 and RS #5, and the type of the channel measurement parameter is L1-RSRP. Assuming L1-RSRP corresponding to RS #2 is less than the third threshold, and L1-RSRP corresponding to RS #5 is greater than the fourth threshold, so the preset condition may be satisfied. At this time, the terminal may transmit the beam measurement report to the network access equipment, in which the beam measurement report may include indication information of L1-RSRP respectively corresponding to each RS (that is, RS #1, RS #2, and RS #3) in the set of target RSs, and also include indication information of L1-RSRP corresponding to RS #5.

When the beam measurement result satisfies the preset condition, it indicates that there is a TCI state corresponding to RS with smaller channel measurement parameter in the set of target TCI states and also a TCI state corresponding to other RS with greater channel measurement parameter. At that time, the terminal transmits the beam measurement report to the network access equipment so that the network access equipment may update the set of target TCI states based on the beam measurement report. For example, the TCI state corresponding to other RS with greater channel measurement parameter is added to the set of target TCI states, and the TCI state corresponding to RS with smaller channel measurement parameter is deleted from the set of target TCI states.

In embodiments of the disclosure, indication information of the channel measurement parameter corresponding to RS may be configured to indicate a size of the channel measurement parameter. In an example, indication information of channel measurement parameters corresponding to the k RSs in the beam measurement report may be represented in the following manner. In the k RSs, indication information of a channel measurement parameter corresponding to an optimal RS is represented by a bits, the optimal RS is a RS with the largest channel measurement parameter in the k RSs, and a is a positive integer; in the k RSs, indication information of a channel measurement parameter corresponding to each of remaining RSs except the optimal RS is represented by b bits, and b is a positive integer. Optionally, the a bits may represent the absolute value of the channel measurement parameter corresponding to the optimal RS. indication information of a channel measurement parameter corresponding to a $i^{th}$ remaining RS is configured to indicate a difference between the channel measurement parameter corresponding to the $i^{th}$ remaining RS and the channel measurement parameter corresponding to the optimal RS, or indicate that a channel measurement parameter corresponding to the $i^{th}$ remaining RS is smaller than a preset threshold, and i is a positive integer. Values of a and b may be set based on the type of the channel measurement parameter and the corresponding range. For example, when the channel measurement parameter is L1-RSRP, a=7 and b=4.

Optionally, in the various sequences formed by b bits, a specified sequence may be selected to indicate a channel measurement parameter corresponding to RS is less than the preset threshold. For example, when b=4, 16 various sequences may be formed. Assuming a sequence "0000" is selected to indicate that the channel measurement parameter corresponding to RS is less than the preset threshold. When the channel measurement parameter corresponding to a certain RS is less than the preset threshold, it indicates that the beam failure occurs in the beam corresponding to RS. The preset threshold may be set based on the type of the channel measurement parameter. For example, when the channel measurement parameter is L1-RSRP, the preset threshold may be set at −140 db. In this case, when the network access equipment finds from the channel measurement report that the indication information of the channel measurement parameter corresponding to the certain RS is represented by the specified sequence, it may know that the beam failure occurs in the beam corresponding to this RS. Later, the network access equipment may delete the TCI state corresponding to this RS from the set of target TCI states.

Optionally, the beam measurement report may include indication information of the parameter type. If a plurality of types of channel measurement parameters are available to the terminal, the terminal may add indication information of the parameter type to the beam measurement report for indicating the type of the channel measurement parameter.

In block 203, the network access equipment updates the set of target TCI states based on the beam measurement report. In an example, the network access equipment adds at least one TCI state to the set of target TCI states, and/or delete at least one TCI state from the set of target TCI states; in which, the channel measurement parameter of RS corresponding to the TCI state added to the set of target TCI states is greater than the channel measurement parameter of RS corresponding to the TCI state deleted from the set of target TCI states.

As an example, it is assumed that the beam measurement report received by the network access equipment includes indication information of the channel measurement parameter corresponding to each RS (e.g., RS #1, RS #2, and RS #3) in the set of target RSs, and further includes indication information of the channel measurement parameter corresponding to at least one other RS (e.g., RS #4). If the network access equipment, based on this information, determines that, the channel measurement parameter corresponding to RS #4 is greater than the channel measurement parameter corresponding to RS #2, the network access equipment may delete the TCI state corresponding to RS #2 from the set of target TCI states, and add the TCI state corresponding to RS #4 to the set of target TCI states.

In block 204, the network access equipment transmits TCI state update information to the terminal. The TCI state update information is configured to indicate TCI states included in the updated set of target TCI states. In an example, the TCI state update information includes indication information of RS corresponding to each TCI state of the updated set of target TCI states. In another example, the TCI state update information includes adding indication information and/or deleting indication information, in which, the adding indication information is configured to indicate the TCI state that needs to add to the set of target TCI states, and the deleting indication information is configured to indicate the TCI state that needs to delete from the set of target TCI states.

Optionally, the network access equipment may transmit the TCI state update information to the terminal through RRC signaling. Correspondingly, the terminal may receive the TCI state update information from the network access equipment and updates the set of target TCI states based on the TCI state update information.

In conclusion, in the technical solutions provided in embodiments of the disclosure, the beam measurement result is obtained through the terminal. When the terminal detects that the beam measurement result satisfies the preset condition, the terminal transmits the beam measurement report to the network access equipment. Compared with the terminal adopting the periodic, aperiodic or semi-static approach to transmit the beam measurement report to the network access equipment, the technical solutions provided in the embodiments of the disclosure overcome the problems of delayed reporting and more unnecessary reporting, and the terminal transmits the beam measurement report at a reasonable and accurate moment.

In addition, the terminal transmits the beam measurement report to the network access equipment when the terminal detects that the beam measurement result satisfies the preset condition, so that the network access equipment may update the set of TCI states in a timely manner based on the beam measurement report and ensure that the terminal may select an appropriate beam to perform downlink reception and transmission.

In the above method embodiments, the description is given from the perspective of interaction between the network access equipment and the terminal. The action related to the network access equipment may be separately implemented as a method for reporting a beam measurement report on the network access equipment side. The action related to the terminal may be implemented separately as a method for reporting a beam measurement report on the terminal side.

The follows are apparatus embodiments of the disclosure, which may be configured to implement the method embodiments of the disclosure. For details that are not disclosed in the apparatus embodiments of the disclosure, reference should be made to the method embodiments of the disclosure.

Figure 3:
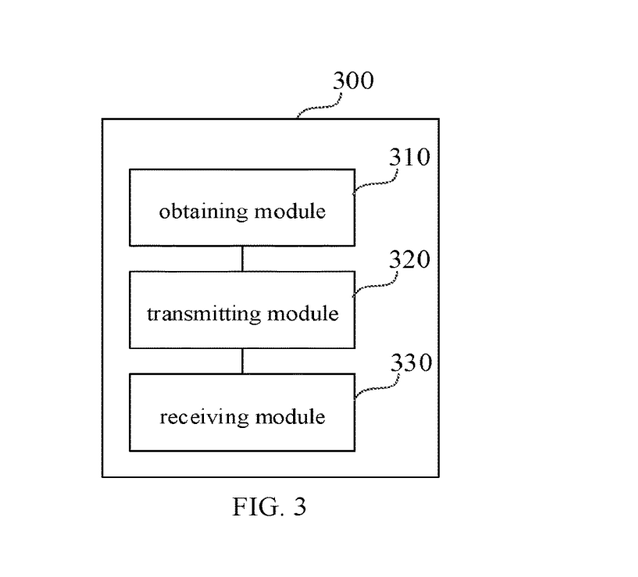
FIG. 3 is a block diagram illustrating an apparatus for reporting a beam measurement report, according to an exemplary embodiment.

FIG. 3 is a block diagram illustrating an apparatus for reporting a beam measurement report, according to an exemplary embodiment. The apparatus has the function of realizing the above method embodiments on the terminal side, and the function may be realized by hardware, or by hardware executing corresponding software. The apparatus may be the terminal introduced above, and may be also set in the terminal. The apparatus 300 may include an obtaining module 310, a transmitting module 320, and a receiving module 330. Of course, it should be understood that one or more of the modules described in this specification can be implemented by hardware, such as circuitry.

The obtaining module 310 is configured to obtain a beam measurement result, in which the beam measurement result includes channel measurement parameters corresponding to n reference signals RSs included in a set of target RSs and channel measurement parameters corresponding to m other RSs except the set of target RSs, the set of target RSs is corresponding to a set of target transmission configuration indication TCI states, and the set of target TCI states includes n TCI states indicated by a network access equipment to the terminal, where n is a positive integer, and m is a positive integer.

The transmitting module 320 is configured to transmit the beam measurement report to the network access equipment when the beam measurement result satisfies a preset condition, in which the beam measurement report is configured to trigger the network access equipment to update the set of target TCI states.

The receiving module 330 is configured to receive TCI state update information from the network access equipment, in which the TCI state update information is configured to indicate TCI states included in the updated set of target TCI states.

In conclusion, in the technical solutions provided in the disclosure, the beam measurement result is obtained through a terminal. When the terminal detects that the beam measurement result satisfies the preset condition, the terminal transmits the beam measurement report to the network access equipment. Compared with the terminal adopting the periodic, aperiodic or semi-static approach to transmit the beam measurement report to the network access equipment, the technical solutions provided in the embodiments of the disclosure overcome the problems of delayed reporting and more unnecessary reporting, and the terminal transmits the beam measurement report at a reasonable and accurate moment. In addition, the terminal transmits the beam measurement report to the network access equipment when the terminal detects that the beam measurement result satisfies the preset condition, so that the network access equipment may update the set of TCI states in a timely manner based on the beam measurement report and ensure that the terminal may select an appropriate beam to perform downlink reception and transmission.

In alternative embodiments based on the embodiments provided in FIG. 3, the set of target TCI states is a set of TCI states of physical downlink control channel PDCCH or physical downlink shared channel PDSCH, indicated by the network access equipment to the terminal through radio resource control RRC signaling, or the set of target TCI states is a set of TCI states of physical downlink control channel PDCCH or physical downlink shared channel PDSCH, activated by the network access equipment through media access control MAC control element CE signaling.

In alternative embodiments based on the above alternative embodiments or the embodiments provided in FIG. 3, the beam measurement report includes: identification information of k RSs and indication information of channel measurement parameters corresponding to the k RSs, where k is an integer greater than 1. The k RSs include: then RSs and at least one of the m other RSs, and the at least one of the m other RSs has a channel measurement parameter greater than a channel measurement parameter corresponding to a target RS, in which the target RS is a RS with the smallest channel measurement parameter in the n RSs.

Alternatively, in the k RSs, indication information of a channel measurement parameter corresponding to an optimal RS is represented by a bits, the optimal RS is a RS with the largest channel measurement parameter in the k RSs, and a is a positive integer. In the k RSs, indication information of a channel measurement parameter corresponding to each of remaining RSs except the optimal RS is represented by b bits, and b is a positive integer. Indication information of a channel measurement parameter corresponding to a $i^{th}$ remaining RS is configured to indicate a difference between the channel measurement parameter corresponding to the $i^{th}$ remaining RS and the channel measurement parameter corresponding to the optimal RS, or indicate that a channel measurement parameter corresponding to the $i^{th}$ remaining RS is smaller than a preset threshold, and i is a positive integer.

In alternative embodiments based on the above alternative embodiments or the embodiments provided in FIG. 3, the preset condition includes any of: top w RSs in descending order in a channel measurement parameter corresponding to each RS in the beam measurement result are different from that of a beam measurement result obtained last time, and w is a positive integer; or a channel measurement parameter corresponding to at least one RS in the set of target RSs is smaller than a first threshold; or a sum of a channel measurement parameter corresponding to at least one RS in the set of target RSs and a preset offset is less than a maximum of channel measurement parameters corresponding to the in other RSs; or a channel measurement parameter corresponding to at least one other RS in the in other RSs is greater than a second threshold; or a channel measurement parameter corresponding to at least one RS in the set of target RSs is smaller than a third threshold, and a channel measurement parameter corresponding to at least one other RS in the m other RSs is greater than a fourth threshold.

In alternative embodiments based on the above alternative embodiments or the embodiments provided in FIG. 3, the receiving module 330 is configured to receive configuration information from the network access equipment, in which the configuration information includes at least one of: measured object configuration information, measured parameter configuration information, report triggering configuration information, and report content configuration information.

The measured object configuration information is configured to indicate a RS that needs to obtain a channel measurement parameter, the measured parameter configuration information is configured to indicate a type of the channel measurement parameter, the report triggering configuration information is configured to indicate the preset condition that needs to be satisfied when transmitting the beam measurement report to the network access equipment, and the report content configuration information is configured to indicate content in the beam measurement report to be transmitted to the network access equipment.

Figure 4:
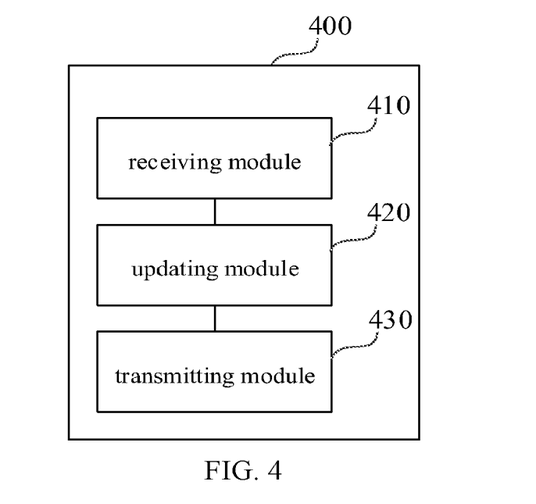
FIG. 4 is a block diagram illustrating an apparatus for reporting a beam measurement report, according to another exemplary embodiment.

FIG. 4 is a block diagram illustrating an apparatus for reporting a beam measurement report, according to another exemplary embodiment. The apparatus has the function of realizing the above method embodiments on the network access equipment side, and the function may be realized by hardware, or by hardware executing corresponding software. The apparatus may be the network access equipment introduced above, and may be set in the network access equipment. The apparatus 400 may include a receiving module 410, an updating module 420, and a transmitting module 430.

The receiving module 410 is configured to receive from a terminal, the beam measurement report that is transmitted by the terminal when a beam measurement result satisfies a preset condition, in which the beam measurement result includes channel measurement parameters corresponding to n reference signals RSs included in a set of target RSs and channel measurement parameters corresponding to m other RSs except the set of target RSs, the set of target RSs is corresponding to a set of target transmission configuration indication TCI states, and the set of target TCI states includes n TCI states indicated by a network access equipment to the terminal, where n is a positive integer, and m is a positive integer.

The updating module 420 is configured to update the set of target TCI states based on the beam measurement report.

The transmitting module 430 is configured to transmit TCI state update information to the terminal, in which the TCI state update information is configured to indicate TCI states included in the updated set of target TCI states.

In conclusion, in the technical solutions provided in the disclosure, the beam measurement result is obtained through a terminal. When the terminal detects that the beam measurement result satisfies the preset condition, the terminal transmits the beam measurement report to the network access equipment. Compared with the terminal adopting the periodic, aperiodic or semi-static approach to transmit the beam measurement report to the network access equipment, the technical solutions provided in the embodiments of the disclosure overcome the problems of delayed reporting and more unnecessary reporting, and the terminal transmits the beam measurement report at a reasonable and accurate moment. In addition, the terminal transmits the beam measurement report to the network access equipment when the terminal detects that the beam measurement result satisfies the preset condition, so that the network access equipment may update the set of TCI states in a timely manner based on the beam measurement report and ensure that the terminal may select an appropriate beam to perform downlink reception and transmission.

In alternative embodiments based on the embodiments provided in FIG. 4, the set of target TCI states is a set of TCI states of physical downlink control channel PDCCH or physical downlink shared channel PDSCH, indicated by the network access equipment to the terminal through radio resource control RRC signaling; or the set of target TCI states is a set of TCI states of physical downlink control channel PDCCH or physical downlink shared channel PDSCH, activated by the network access equipment through media access control MAC control element CE signaling.

In alternative embodiments based on the above embodiments or the embodiments provided in FIG. 4, the beam measurement report includes: identification information of k RSs and indication information of channel measurement parameters corresponding to the k RSs, where k is an integer greater than 1. The k RSs can include the n RSs and at least one of the m other RSs, and the at least one of the m other RSs has a channel measurement parameter greater than a channel measurement parameter corresponding to a target RS, in which the target RS is a RS with the smallest channel measurement parameter in the n RSs.

Alternatively, the updating module 420 is configured to add at least one TCI state into the set of target TCI states, and/or delete at least one TCI state from the set of target TCI states, in which a channel measurement parameter of a RS corresponding to the TCI state added into the set of target TCI states, is greater than, a channel measurement parameter of a RS corresponding to the TCI state deleted from the set of target TCI states.

In alternative embodiments based on the above embodiments or the embodiments provided in FIG. 4, the transmitting module 430 is configured to transmit configuration information to the terminal, in which the configuration information includes at least one of: measured object configuration information, measured parameter configuration information, report triggering configuration information, and report content configuration information.

The measured object configuration information is configured to indicate a RS that needs to obtain a channel measurement parameter, the measured parameter configuration information is configured to indicate a type of the channel measurement parameter, the report triggering configuration information is configured to indicate the preset condition that needs to be satisfied when transmitting the beam measurement report to the network access equipment, and the report content configuration information is configured to indicate content in the beam measurement report to be transmitted to the network access equipment.

It should be noted that, when the apparatus provided in the above embodiments realizes its functions, only the division of the above functional modules is used as an example. In actual applications, the above functions may be allocated by different functional modules according to actual needs. That is, the content structure of the apparatus is divided into different function modules to complete all or part of the functions described above.

Regarding to the apparatus in the above embodiments, the specific methods in which each module performs has been described in detail in the embodiments of the method, and will not be elaborated here.

From the perspective of the interaction between the network access equipment and the terminal, the above introduces solutions provided in the embodiments of the disclosure. It can be understood that the network access equipment and the terminal may realize the above functions, and include hardware structures and/or software modules to execute corresponding specific functions. Combined with units and algorithm blocks of examples of embodiments disclosed in this disclosure, the embodiments may be realized by hardware or the combination of hardware and computer software. Whether a certain function is executed by hardware or driving hardware by computer software may be determined by specific application and design constraints of the technical solution. Those skilled in the art may use different methods for each specific application to implement the described functions, but such implementation may not be considered as going beyond the scope of the technical solutions of the embodiments of the disclosure.

Figure 5:
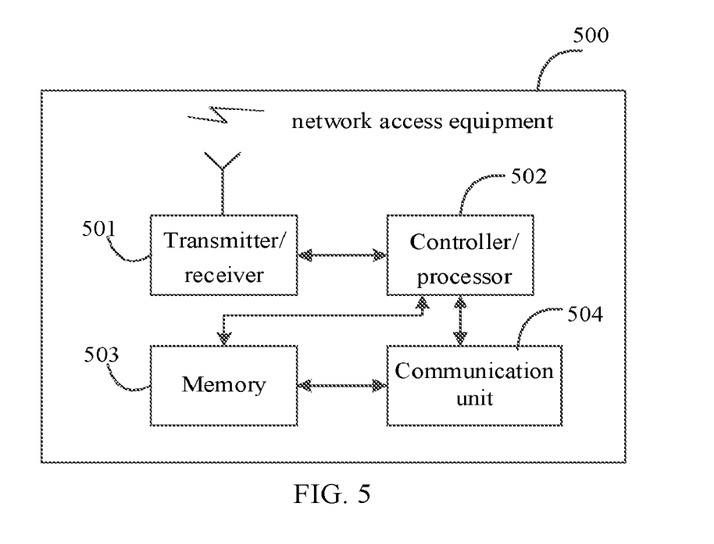
FIG. 5 is a block diagram illustrating a network access equipment, according to an exemplary embodiment.

FIG. 5 is a block diagram illustrating a network access equipment, according to an exemplary embodiment. The network access equipment 500 includes a transmitter/receiver 501 and a processor 502. The processor 502 may be a controller. FIG. 5 illustrates "controller/processor 502". The transmitter/receiver 501 is configured to support the information transmission and reception between the network access equipment and the terminal in the above embodiments, and to support communication between the network access equipment and other network entities. The processor 502 executes all functions for communicating with the terminal. On the uplink, the uplink signal from the terminal is received by the antenna, demodulated by the receiver 501 (for example, the high-frequency signal is modulated into a base-band signal), and further processed by the processor 502 to restore service data and signaling messages transmitted by the terminal. On the downlink, service data and signaling messages are processed by the processor 502, and modulated by the transmitter 501 (for example, a base-band signal is modulated into a high-frequency signal) to generate a downlink signal, which is transmitted to the terminal by an antenna. It should be noted that the functions of demodulation or modulation may also be achieved by the processor 502. For example, the processor 502 is further configured to execute each action of the network access equipment side in the above method embodiments, and/or other actions of the technical solutions described in the embodiments of the disclosure.

Further, the network access equipment 500 may also include memory 503. The memory 503 is configured to store program codes and data of the network access equipment 500. In addition, the network access equipment 500 may also include a communication unit 504. The communication unit 504 is configured to support the network access equipment 500 to communicate with other network entities (for example, network devices in the core network). For example, in the 5G NR system, the communication unit 504 may be a NG-U interface for supporting the network access equipment 500 to communicate with UPF (User Plane Function) entities; or, the communication unit 504 may also be a NG-C interface, which is configured to support the communication between the network access equipment 500 and AMF (Access and Mobility Management Function) entities.

It should be understood that FIG. 5 only illustrates a simplified design of the network access equipment 500. In practical applications, the network access equipment 500 may include any number of transmitters, receivers, processors, controllers, memories, communication units, etc., and all the network access equipment that realize the embodiments of the disclosure may be within the protection scope of the embodiments of the disclosure.

Figure 6:
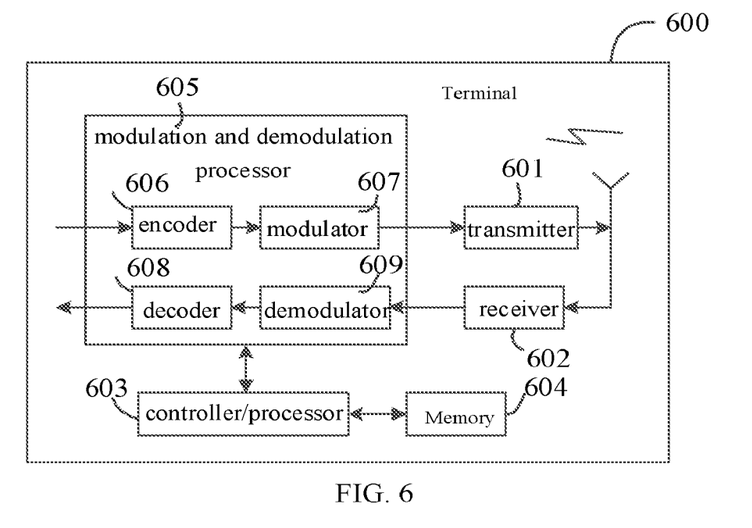
FIG. 6 is a block diagram illustrating a terminal, according to an exemplary embodiment.

FIG. 6 is a block diagram illustrating a terminal, according to an exemplary embodiment. The terminal 600 includes a transmitter 601, a receiver 602 and a processor 603. The processor 603 may be a controller. FIG. 6 illustrates "controller/processor 603". Optionally, the terminal 600 may further include a modulation and demodulation processor 605. The modulation and demodulation processor 605 may include an encoder 606, a modulator 607, a decoder 608, and a demodulator 609.

In an example, the transmitter 601 adjusts (e.g., analog conversion, filter, amplification, and up conversion) output samples and generates an uplink signal. The uplink signal is transmitted to the network access equipment described in the above embodiments by an antenna. On the downlink, the antenna receives the downlink signal transmitted by the network access equipment in the above embodiments. The receiver 602 adjusts (e.g., filter, amplification, down conversion, and digitization) the signal received from the antenna and provides input samples. In the modulation and demodulation processor 605, the encoder 606 receives service data and signaling messages to be sent on the uplink, and processes the service data and signaling messages (e.g., formatting, encoding, and intertwining). The modulator 607 further processes (e.g., symbol mapping and modulation) the encoded service data and signaling messages and provides output samples. The demodulator 609 processes (e.g., demodulation) the input samples and provides symbol estimation. The decoder 608 processes (e.g., de-intertwining and decoding) the symbol estimation and provides decoded data and signaling messages sent to the terminal 600. The encoder 606, the modulator 607, the demodulator 609, and the decoder 608 may be implemented by a synthesized modulation and demodulation processor 605. These units are processed according to the wireless access technology adopted by the wireless access network (e.g., the LTE (Long Term Evolution) and access technologies of other evolved systems). It should be noted that when the terminal 600 does not include the processor 605, the above functions of the processor 605 may also be realized by the processor 603.

The processor 603 controls and manages the actions of the terminal 600, and is configured to execute the processing procedure performed by the terminal 600 in the above embodiments of the disclosure. For example, the processor 603 is further configured to execute each action of the terminal side in the above method embodiments, and/or other actions of the technical solutions described in the embodiments of the disclosure.

Further, the terminal 600 may also include a memory 604. The memory 604 is configured to store program codes and data for the terminal 600.

It should be understood that FIG. 6 only illustrates a simplified design of the terminal 600. In practical applications, the terminal 600 may include any number of transmitters, receivers, processors, modem processors, memories, and the like, and all terminals that can implement the embodiments of the disclosure are within the protection scope of the embodiments of the disclosure.

The embodiments of the disclosure also provide a non-transitory computer-readable storage medium, on which a computer program is stored, and when the computer program is executed by the processor of the network access equipment, the method for reporting the beam measurement report at the network access equipment side introduced above is implemented.

The embodiments of the disclosure also provide a non-transitory computer-readable storage medium, on which a computer program is stored, and when the computer program is executed by the processor of the terminal, the method for reporting the beam measurement report at the terminal introduced above is implemented.

It should be understood that "multiple or a plurality of" mentioned herein refers to two or more. "And/or" describes the associated relationship of associated objects, and indicates that there are three types of relationships, for example, A and/or B, which means: A exists alone, A and B exist at the same time, and B exists alone. The character "/" generally indicates that associated objects are in an "or" relationship.

Other embodiments of the disclosure will be apparent to those skilled in the art from consideration of the specification and practice of the invention disclosed here. This disclosure is intended to cover any variations, uses, or adaptations of the invention following the general principles thereof and including such departures from the disclosure as come within known or customary practice in the art. It is intended that the specification and examples be considered as exemplary only, with a true scope and spirit of the invention being indicated by the following claims.

It will be appreciated that the disclosure is not limited to the exact construction that has been described above and illustrated in the accompanying drawings and that various modifications and changes can be made without departing from the scope thereof. It is intended that the scope of the invention only be limited by the appended claims.

The invention claimed is:

1. A method for reporting a beam measurement report, comprising:
obtaining, by a terminal, a beam measurement result, wherein the beam measurement result comprises channel measurement parameters corresponding to n reference signals RSs comprised in a set of target RSs and channel measurement parameters corresponding to m other RSs except the set of target RSs, the set of target RSs is corresponding to a set of target transmission configuration indication TCI states, and the set of target TCI states comprises n TCI states indicated by a network access equipment to the terminal, where n is a positive integer, and m is a positive integer;
transmitting, by the terminal, the beam measurement report to the network access equipment when the beam measurement result satisfies a preset condition, wherein the beam measurement report is configured to trigger the network access equipment to update the set of target TCI states; and
receiving, by the terminal, TCI state update information from the network access equipment, wherein the TCI state update information is configured to indicate TCI states comprised in the updated set of target TCI states;
wherein the preset condition comprises:
a channel measurement parameter corresponding to an RS in the set of target RSs is smaller than a first threshold; or,
a channel measurement parameter corresponding to an RS in the set of target RSs is smaller than a third threshold, and a channel measurement parameter corresponding to other RS in the m other RSs is greater than a fourth threshold.

2. The method of claim 1, wherein,
the set of target TCI states is a set of TCI states of physical downlink control channel PDCCH or physical downlink shared channel PDSCH, indicated by the network access equipment to the terminal through radio resource control RRC signaling;
or,
the set of target TCI states is a set of TCI states of physical downlink control channel PDCCH or physical downlink shared channel PDSCH, activated by the network access equipment through media access control MAC control element CE signaling.

3. The method of claim 1, wherein the beam measurement report comprises: identification information of k RSs and indication information of channel measurement parameters corresponding to the k RSs, where k is an integer greater than 1;
wherein, the k RSs comprise: the n RSs and at least one of the m other RSs, the at least one of the m other RSs has a channel measurement parameter greater than a channel measurement parameter corresponding to a target RS, in which the target RS is a RS with the smallest channel measurement parameter in the n RSs.

4. The method of claim 3, wherein,
in the k RSs, indication information of a channel measurement parameter corresponding to an optimal RS is represented by a bits, the optimal RS is a RS with the largest channel measurement parameter in the k RSs, and a is a positive integer;
in the k RSs, indication information of a channel measurement parameter corresponding to each of remaining RSs except the optimal RS is represented by b bits, and b is a positive integer;
indication information of a channel measurement parameter corresponding to a $i^{th}$ remaining RS is configured to indicate a difference between the channel measurement parameter corresponding to the $i^{th}$ remaining RS and the channel measurement parameter corresponding to the optimal RS, or indicate that a channel measurement parameter corresponding to the $i^{th}$ remaining RS is smaller than a preset threshold, and i is a positive integer.

5. The method of claim 1, wherein the preset condition further comprises any of:
top w RSs in descending order in a channel measurement parameter corresponding to each RS in the beam measurement result are different from that of a beam measurement result obtained last time, and w is a positive integer;
or, a sum of a channel measurement parameter corresponding to at least one RS in the set of target RSs and a preset offset is less than a maximum of channel measurement parameters corresponding to the in other RSs;

or, a channel measurement parameter corresponding to at least one other RS in the m other RSs is greater than a second threshold.

6. The method of claim 1, further comprising:

receiving, by the terminal, configuration information from the network access equipment, wherein the configuration information comprises at least one of: measured object configuration information, measured parameter configuration information, report triggering configuration information, and report content configuration information, wherein, the measured object configuration information is configured to indicate a RS that needs to obtain a channel measurement parameter, the measured parameter configuration information is configured to indicate a type of the channel measurement parameter, the report triggering configuration information is configured to indicate the preset condition that needs to be satisfied when transmitting the beam measurement report to the network access equipment, and the report content configuration information is configured to indicate content in the beam measurement report to be transmitted to the network access equipment.

7. A method for reporting a beam measurement report, comprising:

receiving from a terminal, by a network access equipment, the beam measurement report that is transmitted by the terminal when a beam measurement result satisfies a preset condition, wherein the beam measurement result comprises channel measurement parameters corresponding to n reference signals RSs comprised in a set of target RSs and channel measurement parameters corresponding to m other RSs except the set of target RSs, the set of target RSs is corresponding to a set of target transmission configuration indication TCI states, and the set of target TCI states comprises n TCI states indicated by a network access equipment to the terminal, where n is a positive integer, and m is a positive integer;

updating, by the network access equipment, the set of target TCI states based on the beam measurement report; and transmitting, by the network access equipment, TCI state update information to the terminal, wherein the TCI state update information is configured to indicate TCI states comprised in the updated set of target TCI states;

wherein the preset condition comprises:

a channel measurement parameter corresponding to an RS in the set of target RSs is smaller than a first threshold;

or, a channel measurement parameter corresponding to an RS in the set of target RSs is smaller than a third threshold, and a channel measurement parameter corresponding to other RS in the in other RSs is greater than a fourth threshold.

8. The method of claim 7, wherein, the set of target TCI states is a set of TCI states of physical downlink control channel PDCCH or physical downlink shared channel PDSCH, indicated by the network access equipment to the terminal through radio resource control RRC signaling;

or, the set of target TCI states is a set of TCI states of physical downlink control channel PDCCH or physical downlink shared channel PDSCH, activated by the network access equipment through media access control MAC control element CE signaling.

9. The method of claim 7, wherein the beam measurement report comprises: identification information of k RSs and indication information of channel measurement parameters corresponding to the k RSs, where k is an integer greater than 1;

wherein, the k RSs comprise: the n RSs and at least one of the m other RSs, the at least one of the m other RSs has a channel measurement parameter greater than a channel measurement parameter corresponding to a target RS, in which the target RS is a RS with the smallest channel measurement parameter in the n RSs.

10. The method of claim 9, wherein updating, by the network access equipment, the set of target TCI states based on the beam measurement report, comprises:

adding, by the network access equipment, at least one TCI state into the set of target TCI states, and/or deleting, by the network access equipment, at least one TCI state from the set of target TCI states, wherein, a channel measurement parameter of a RS corresponding to the TCI state added into the set of target TCI states, is greater than, a channel measurement parameter of a RS corresponding to the TCI state deleted from the set of target TCI states.

11. The method of claim 7, further comprising:

transmitting, by the network access equipment, configuration information to the terminal, wherein the configuration information comprises at least one of: measured object configuration information, measured parameter configuration information, report triggering configuration information, and report content configuration information, wherein, the measured object configuration information is configured to indicate a RS that needs to obtain a channel measurement parameter, the measured parameter configuration information is configured to indicate a type of the channel measurement parameter, the report triggering configuration information is configured to indicate the preset condition that needs to be satisfied when transmitting the beam measurement report to the network access equipment, and the report content configuration information is configured to indicate content in the beam measurement report to be transmitted to the network access equipment.

12. A terminal, comprising:

a processor;

a memory configured to store instructions executable by the processor;

wherein the processor is configured to:

obtain a beam measurement result, wherein the beam measurement result comprises channel measurement parameters corresponding to n reference signals RSs comprised in a set of target RSs and channel measurement parameters corresponding to m other RSs except the set of target RSs, the set of target RSs is corresponding to a set of target transmission configuration indication TCI states, and the set of target TCI states comprises n TCI states indicated by a network access equipment to the terminal, where n is a positive integer, and m is a positive integer;

transmit the beam measurement report to the network access equipment when the beam measurement result satisfies a preset condition, wherein the beam measurement report is configured to trigger the network access equipment to update the set of target TCI states; and receive TCI state update information from the network access equipment, wherein the TCI state update information is configured to indicate TCI states comprised in the updated set of target TCI states;

wherein the preset condition comprises:

a channel measurement parameter corresponding to an RS in the set of target RSs is smaller than a first threshold; or, a channel measurement parameter corresponding to an RS in the set of target RSs is smaller than a third threshold, and a channel measurement parameter corresponding to other RS in the in other RSs is greater than a fourth threshold.

13. A network access equipment implementing the method of claim 7, comprising:

a processor;

a memory configured to store instructions executable by the processor;

wherein the processor is configured to:

receive from a terminal the beam measurement report that is transmitted by the terminal when a beam measurement result satisfies a preset condition, wherein the beam measurement result comprises channel measurement parameters corresponding to n reference signals RSs comprised in a set of target RSs and channel measurement parameters corresponding to in other RSs except the set of target RSs, the set of target RSs is corresponding to a set of target transmission configuration indication TCI states, and the set of target TCI states comprises n TCI states indicated by a network access equipment to the terminal, where n is a positive integer, and m is a positive integer;

update the set of target TCI states based on the beam measurement report; and transmitting TCI state update information to the terminal, wherein the TCI state update information is configured to indicate TCI states comprised in the updated set of target TCI states;

wherein the preset condition comprises:

a channel measurement parameter corresponding to an RS in the set of target RSs is smaller than a first threshold; or, a channel measurement parameter corresponding to an RS in the set of target RSs is smaller than a third threshold, and a channel measurement parameter corresponding to other RS in the m other RSs is greater than a fourth threshold.

14. The terminal of claim 12, wherein, the set of target TCI states is a set of TCI states of physical downlink control channel PDCCH or physical downlink shared channel PDSCH, indicated by the network access equipment to the terminal through radio resource control RRC signaling;

or, the set of target TCI states is a set of TCI states of physical downlink control channel PDCCH or physical downlink shared channel PDSCH, activated by the network access equipment through media access control MAC control element CE signaling.

15. The terminal of claim 12, wherein, wherein the beam measurement report comprises: identification information of k RSs and indication information of channel measurement parameters corresponding to the k RSs, where k is an integer greater than 1;

wherein, the k RSs comprise: the n RSs and at least one of the m other RSs, the at least one of the m other RSs has a channel measurement parameter greater than a channel measurement parameter corresponding to a target RS, in which the target RS is a RS with the smallest channel measurement parameter in the n RSs.

16. The terminal of claim 15, wherein, in the k RSs, indication information of a channel measurement parameter corresponding to an optimal RS is represented by a bits, the optimal RS is a RS with the largest channel measurement parameter in the k RSs, and a is a positive integer;

in the k RSs, indication information of a channel measurement parameter corresponding to each of remaining RSs except the optimal RS is represented by b bits, and b is a positive integer;

indication information of a channel measurement parameter corresponding to a $i^{th}$ remaining RS is configured to indicate a difference between the channel measurement parameter corresponding to the $i^{th}$ remaining RS and the channel measurement parameter corresponding to the optimal RS, or indicate that a channel measurement parameter corresponding to the $i^{th}$ remaining RS is smaller than a preset threshold, and i is a positive integer.

17. The terminal of claim 12, wherein the preset condition further comprises any of:

top w RSs in descending order in a channel measurement parameter corresponding to each RS in the beam measurement result are different from that of a beam measurement result obtained last time, and w is a positive integer;

or, a sum of a channel measurement parameter corresponding to at least one RS in the set of target RSs and a preset offset is less than a maximum of channel measurement parameters corresponding to the m other RSs;

or, a channel measurement parameter corresponding to at least one other RS in the m other RSs is greater than a second threshold.

18. The terminal of claim 12, wherein the processor is configured to:

receive configuration information from the network access equipment, wherein the configuration information comprises at least one of: measured object configuration information, measured parameter configuration information, report triggering configuration information, and report content configuration information, wherein, the measured object configuration information is configured to indicate a RS that needs to obtain a channel measurement parameter, the measured parameter configuration information is configured to indicate a type of the channel measurement parameter, the report triggering configuration information is configured to indicate the preset condition that needs to be satisfied when transmitting the beam measurement report to the network access equipment, and the report content configuration information is configured to indicate content in the beam measurement report to be transmitted to the network access equipment.

19. The network access equipment of claim 13, wherein, the set of target TCI states is a set of TCI states of physical downlink control channel PDCCH or physical downlink shared channel PDSCH, indicated by the network access equipment to the terminal through radio resource control RRC signaling;

or, the set of target TCI states is a set of TCI states of physical downlink control channel PDCCH or physical downlink shared channel PDSCH, activated by the network access equipment through media access control MAC control element CE signaling.

20. The network access equipment of claim 13, wherein, the beam measurement report comprises: identification information of k RSs and indication information of channel measurement parameters corresponding to the k RSs, where k is an integer greater than 1;

wherein, the k RSs comprise: the n RSs and at least one of the m other RSs, the at least one of the m other RSs has a channel measurement parameter greater than a channel measurement parameter corresponding to a target RS, in which the target RS is a RS with the smallest channel measurement parameter in the n RSs, wherein the processor is configured to:

add at least one TCI state into the set of target TCI states, and/or delete at least one TCI state from the set of target TCI states, wherein, a channel measurement parameter of a RS corresponding to the TCI state added into the set of target TCI states, is greater than, a channel measurement parameter of a RS corresponding to the TCI state deleted from the set of target TCI states.

* * * * *